(12) United States Patent
Cers

(10) Patent No.: US 9,827,911 B2
(45) Date of Patent: Nov. 28, 2017

(54) INSTANTLY SWITCHABLE SEE-THROUGH VEHICULAR REAR-VIEW MIRROR

(71) Applicant: Peteris Alberts Cers, Minneapolis, MN (US)

(72) Inventor: Peteris Alberts Cers, Minneapolis, MN (US)

( * ) Notice: Subject to any disclaimer, the term of this patent is extended or adjusted under 35 U.S.C. 154(b) by 0 days.

(21) Appl. No.: 15/155,132

(22) Filed: May 16, 2016

(65) Prior Publication Data

US 2016/0334617 A1    Nov. 17, 2016

Related U.S. Application Data

(60) Provisional application No. 62/162,303, filed on May 15, 2015.

(51) Int. Cl.
| | | |
|---|---|---|
| *G02B 26/02* | (2006.01) | |
| *B60R 1/08* | (2006.01) | |
| *B60R 1/12* | (2006.01) | |
| *B60R 1/04* | (2006.01) | |
| *G02F 1/15* | (2006.01) | |

(52) U.S. Cl.
CPC ............. *B60R 1/088* (2013.01); *B60R 1/04* (2013.01); *B60R 1/08* (2013.01); *B60R 1/12* (2013.01); *B60R 2001/1215* (2013.01); *G02F 1/15* (2013.01)

(58) Field of Classification Search
CPC .. B60R 1/12; B60R 1/04; B60R 1/087; B60R 1/088; B60R 2001/1215; G02B 26/04; G02B 1/14; G02B 2027/0118; G02B 2027/012; G02B 5/0858; G02F 1/15; G02F 1/153
USPC ........................................................ 359/236
See application file for complete search history.

(56) References Cited

U.S. PATENT DOCUMENTS

| | | |
|---|---|---|
| 7,684,105 B2 | 3/2010 | Lamontagne et al. |
| 2003/0043589 A1* | 3/2003 | Blank .................... B60R 1/088 362/494 |

* cited by examiner

*Primary Examiner* — Euncha Cherry

(57) ABSTRACT

An adjustable rearview mirror that is designed to quickly transition between transparent and reflective states. The apparatus is configured to resemble traditional rearview mirrors used in vehicles. The apparatus includes a window mount, a pivoting connection arm, and a user controlled mirror panel. The window mount connects the rearview mirror to the windshield of a vehicle. The pivoting connection arm enables a user to reposition the rearview mirror at will. The user controlled panel can be placed into a reflective or a transparent state based on user input. A user is able to gain a relatively unhindered view of traffic through a vehicle windshield.

19 Claims, 12 Drawing Sheets a) Micro-blinds closed

4a b) Micro-blinds open

US 9,827,911 B2

INSTANTLY SWITCHABLE SEE-THROUGH VEHICULAR REAR-VIEW MIRROR

The current application claims a priority to the U.S. Provisional Patent application Ser. No. 62/162,303 filed on May 15, 2015.

FIELD OF THE INVENTION

The present invention relates generally to a micro structured glass pane, more particularly, to a display that an individual can quickly transition between a transparent and reflective surface. A user of the present invention will be presented with a rearview mirror that can be made sufficiently transparent upon request.

BACKGROUND OF THE INVENTION

There are many situations in which a driver encounters blockage of his forward field of vision by the rear-view mirror. The height of many drivers alone can put the rear-view mirror in their field of vision. The interior dimensions of compact and sub-compact cars put the rear-view mirror at obstruction level for even average sized drivers. Drivers bending down and around their rear-view mirror are a common sight, confirming that the rear-view mirror is often an obstacle to the clear vision required for safe driving. The rear-view mirror also becomes a vision obstacle when there is a difference in relative angle of the road surface of one driver's car to another. For example: if one's car is on a down slope and they are coming upon a flat intersecting roadway, that alone can cause the mirror to block the driver's direct line-of-sight of a vehicle approaching on the flat intersection from the right, or of a pedestrian in the walkway. This happens similarly when on an upslope, such as a cloverleaf up; one cannot see some of the cars that may be a bit farther up the cloverleaf in order to comfortably anticipate potential speed deceleration requirements.

This invention temporarily removes the main obstacle in a driver's forward field of vision—the center, windshield glass mounted, rear view mirror. This invention is switchable from a reflective, mirrored state, to an open clear state in under one second, and back, in less than one second. This invention will greatly increase driver effectiveness by taking away the largest windshield vision obstacle and is therefore a positive step towards road safety for all who travel in vehicles as driver or passenger, or as a pedestrian or bicyclist on the same roadway. It will also enhance scenery viewing while vacation driving adding to the driver's positive experience.

The micro-blinds exist in a naturally curled, transparent, state. However, the micro-blinds relax to their flat, closed, state in less than one second when an electric current is applied. Thereby returning the reflectivity of a mirror to the driver. Additionally, a phot-electric sensor is used to adjust the opacity of a dimming layer. The "venetian" blind version adjusts the relationship of the blinds from flat to 90 degrees to the driver's angle of view with a small motor to go from a closed to open state and back. The dimming layer function is controlled with the photo-electric sensors in the rim to adjust the glare from the rear.

Additionally, the present invention uses suspended particle distribution (SPD) films, which function as light valves, to modify the transparency and reflectivity of the transition panel. In an SPD panel, millions of these SPDs are placed between two panels of glass or plastic, which is coated with a transparent conductive material. When electricity comes into contact with the SPDs via the conductive coating, they line up in a straight line and allow light to flow through. Once the electricity is taken away, they move back into a random pattern and block light. When the amount of voltage is decreased, the window darkens until it's completely dark after all electricity is taken away.

The present invention makes use of the novel micro-blind technology disclosed in U.S. Pat. No. 7,684,105B2. This Canadian micro-blind technology is a microstructured array of electrostatically actuated electrodes that transition from a cylindrical to a planar orientation when exposed to an electric voltage. To create the Canadian micro-blind a thin film of chromium, or other electrostatically stressed metal, is deposited onto a transparent conductive oxide (TCO) layer and then the stress metal is laser etched into a desired geometry. Using this manufacturing process the Canadian micro-blind array is able to achieve closing (roll-down) times in the order of milliseconds and opening (roll-up) times under one second. The Canadian micro-blind is a low power technology which uses actuation voltages as low as 20-30V. The Canadian micro-blind is able to achieve rolled radii as small as 3 micrometers. Additionally, the TCO layer can be extremely thin. Thus facilitating the creation of thin electro statically actuated panels that can transition from transparent to opaque in less than one second. The above described specifications of the Canadian micro-blind technology serve to elucidate the function of one possible embodiment of the micro-blind technology used in the present invention, and are not intended to limit the present invention.

DETAIL DESCRIPTIONS OF THE INVENTION

All illustrations of the drawings are for the purpose of describing selected versions of the present invention and are not intended to limit the scope of the present invention.

Figure 1:
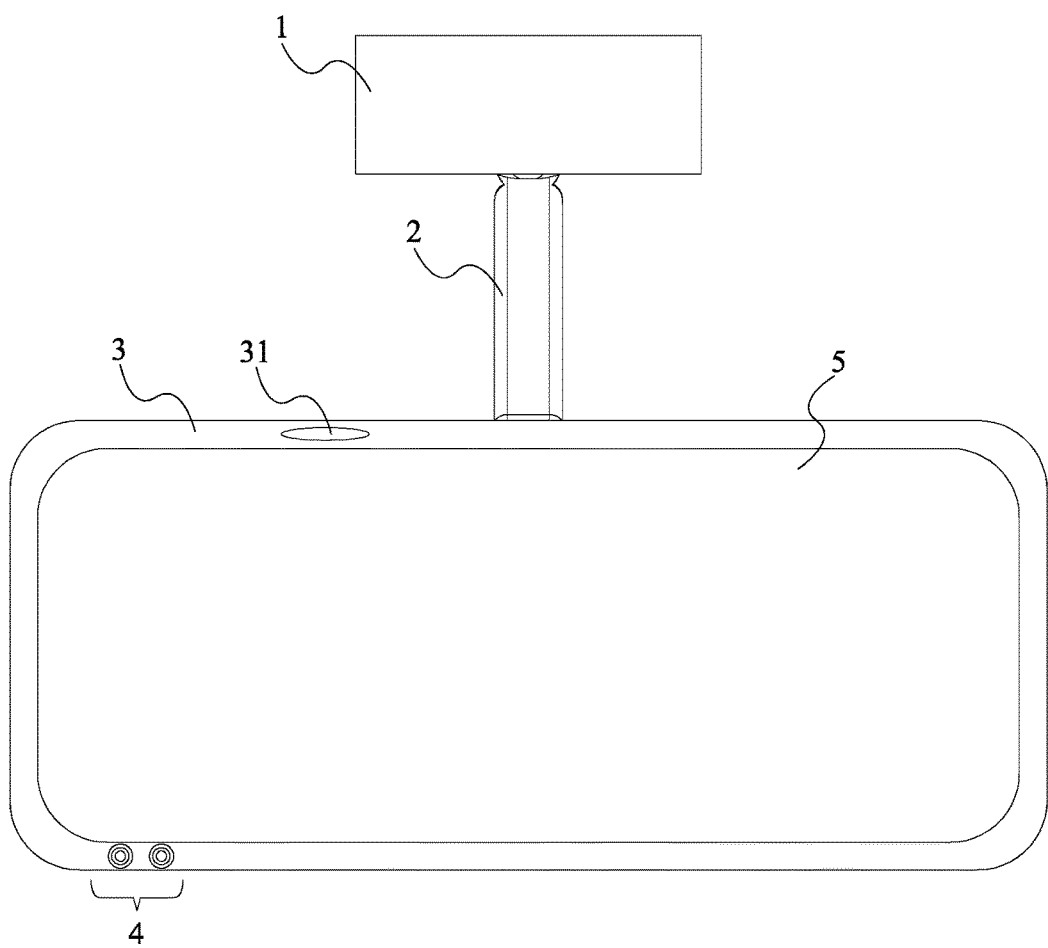
FIG. 1 is a front view of the present invention.

In reference to FIG. 1, the preferred embodiment of the present invention, the Instantly Switchable See-Through Vehicular Rear-View Mirror, is an electronically-controlled transitioning panel that makes use of stacked layers of modified panes of glass, or other rigid transparent material, to transition between a transparent and reflective viewing surface. The electronically-controlled transitioning panel comprises a control unit 1, a boom 2, a mirror frame 3, a control panel 4, and a transition panel 5. It is an aim of the present invention to provide an electronically-controlled transitioning panel which functions as a rear-view mirror when the transition panel 5 is in a reflective state. The present invention enables a user to switch the transition panel 5 between a transparent and a reflective state, by interacting with the control panel 4 on the mirror frame 3. In this way, the electronically-controlled transitioning panel acts as a rear-view mirror that grants a user an unobstructed field of view through their windshield, while in the transparent state. It is an aim of the present invention to provide an electronically-controlled transitioning panel that is repositionable similar to a traditional rear-view mirror. That is, the boom 2 is pivotably connected between the control unit 1 and mirror frame 3. The control unit 1 is mounted onto a windshield, and thus repositioning the boom 2 and mirror frame 3 enables a user to adjust the viewing area seen on the transition panel 5 while it is in the reflective state. In some embodiments the control unit 1 is mounted onto the ceiling of the vehicle. In other embodiments the control unit 1 is mounted onto the frame of the windshield. In these embodiments the control unit 1 is mounted on locations which facilitate generating the largest possible unobstructed viewing angle.

Figure 2:
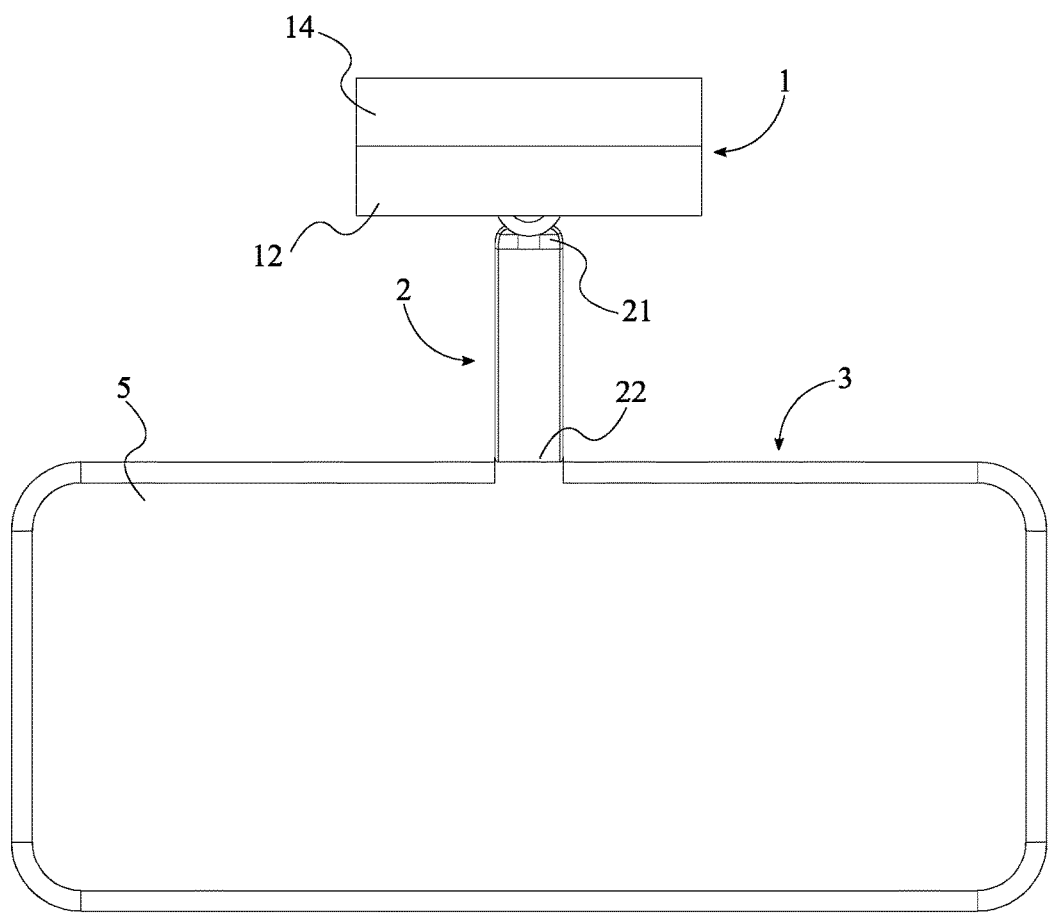
FIG. 2 is a rear view of the present invention.

In reference to FIG. 1 and FIG. 2, the control unit 1 functions as the central processor for the electronically-controlled transitioning panel. Additionally, the control unit 1 functions as the mounting mechanism that connects the electronically-controlled transitioning panel to the windshield of a vehicle. The control unit 1 comprises a microprocessor 11, a housing 12, and a window attachment mechanism 14. In the preferred embodiment of the present invention, the housing 12 is a rigid enclosure for the microprocessor 11. The microprocessor 11 is electronically connected to the transition panel 5, the mirror frame 3, and the remaining electronic components of the electronically-controlled transitioning panel. In the preferred embodiment of the present invention, the microprocessor 11 is electronically connected to the vehicle in which the electronically-controlled transitioning panel is mounted. As a result, electrical power is transferred to the electronically-controlled transitioning panel. Additionally, a user is able to govern the operation of the electronically-controlled transitioning panel by interacting with control panels 4 integrated into the steering wheel or other components of the vehicle in which the present invention is mounted. The window attachment mechanism 14 attaches the housing 12 to the windshield of a vehicle. In a supplementary embodiment the window attachment mechanism 14 makes use of mechanical fasteners such as screws clamps, latches, and the like. In a separate embodiment the window attachment mechanism 14 makes use adhesives to become attached to the windshield of a vehicle. In the preferred embodiment of the present invention, the housing 12 further comprises a display device 13. In this embodiment the display device 13 is integrated into the housing 12 and electronically connected to the microprocessor 11. The display device 13 is located in a position which facilitates presenting a user with a clear view of pertinent system information, such as temperature, time, heading, and the like.

Figure 3:
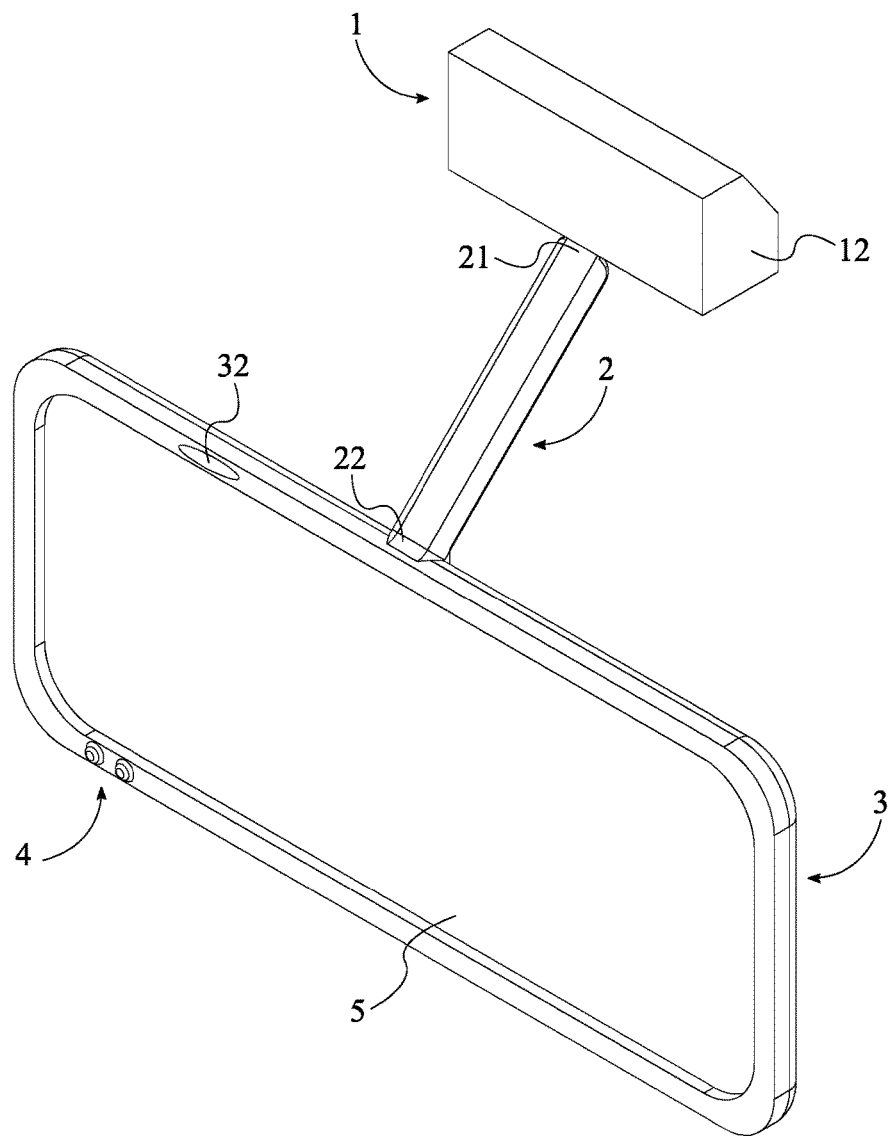
FIG. 3 is an isometric perspective view of the present invention.
Figure 4:
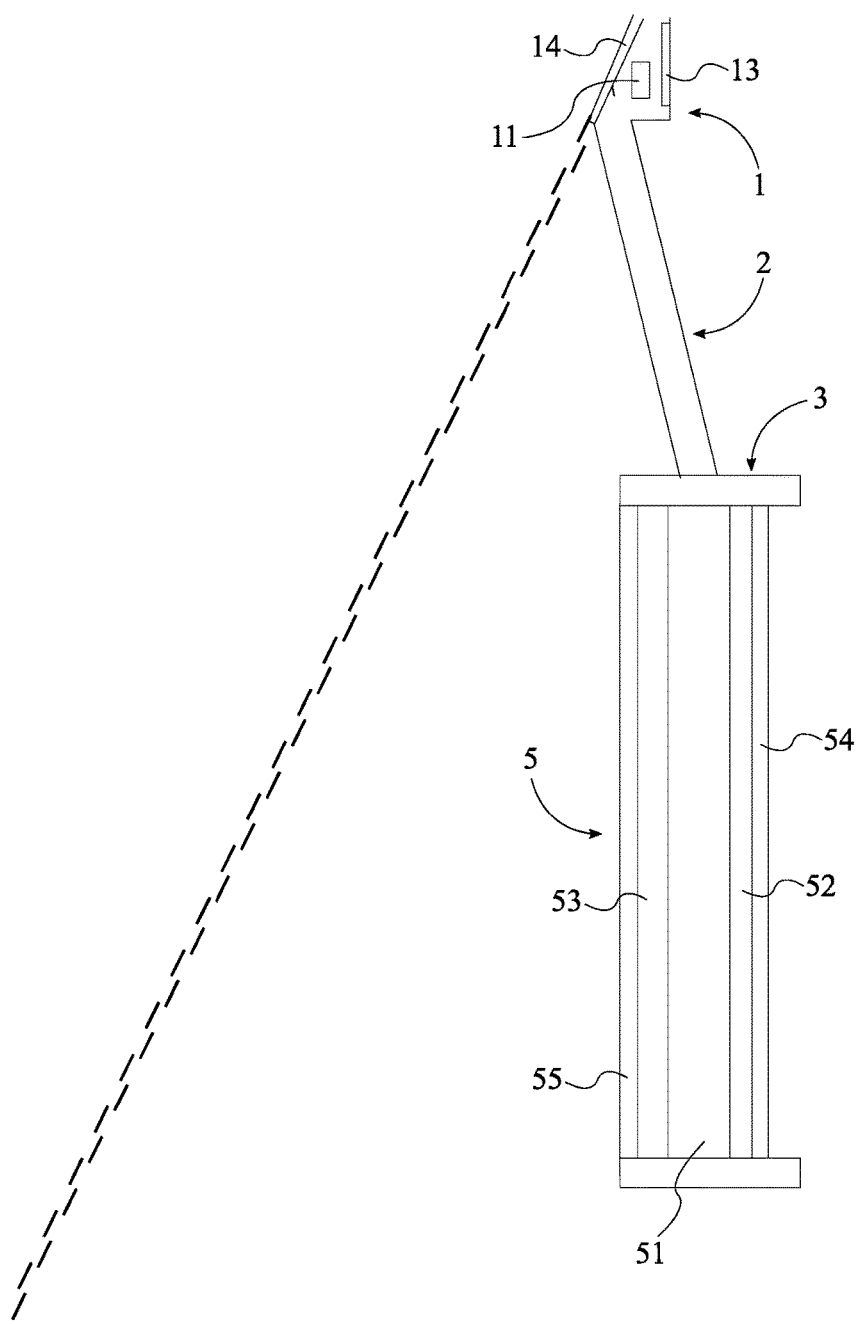
FIG. 4 is a right-side sectional view illustrating the components of one embodiment of the present invention.
Figure 5:
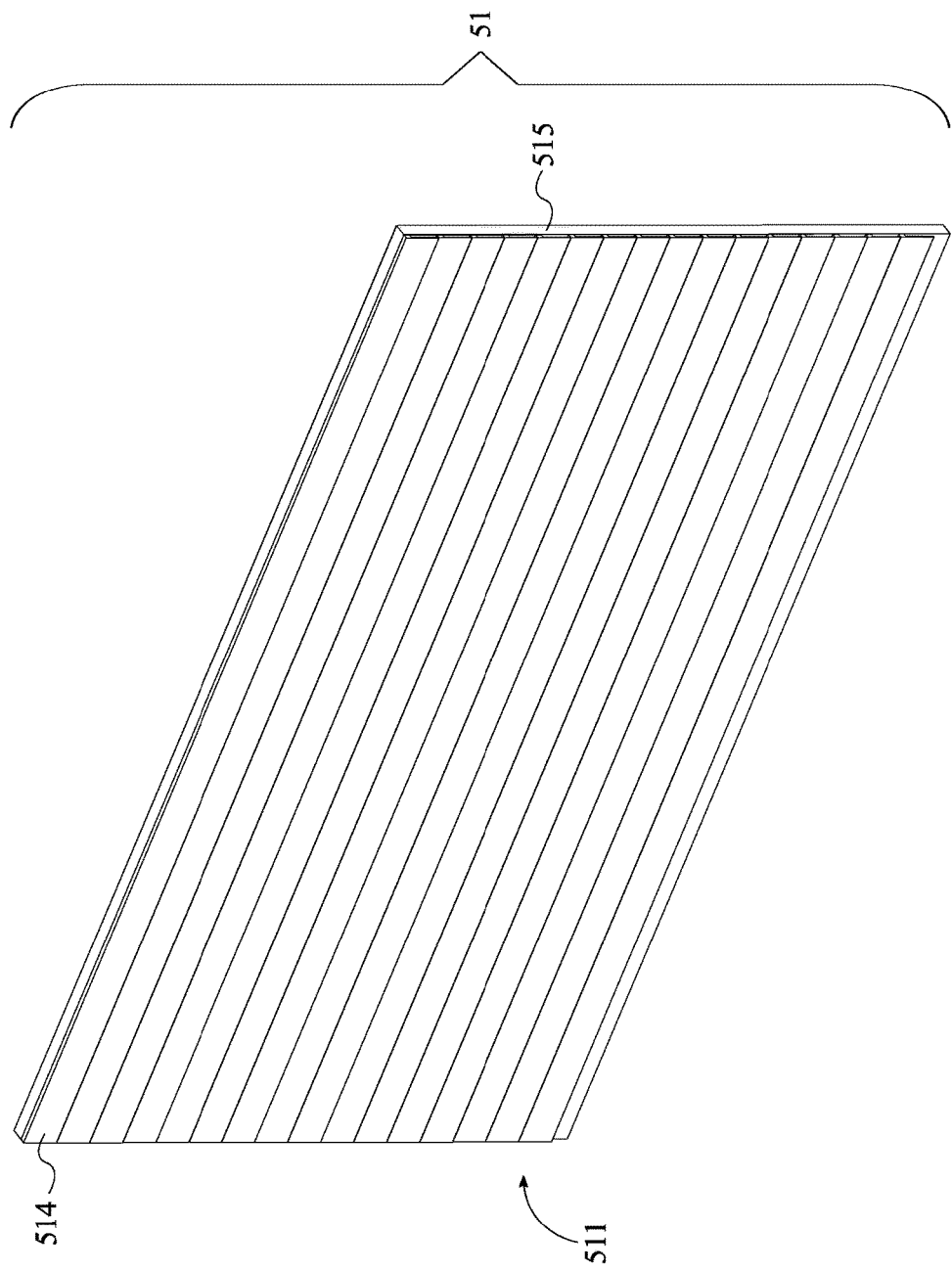
FIG. 5 is a perspective view illustrating the adjustable optical blind used in one embodiment of the present invention. In this embodiment, each of the plurality of micro-blinds is designed with a piezo electric blind body that is a continuous strip.

In reference to FIG. 3 and FIG. 4, in the preferred embodiment of the present invention, the mirror frame 3 is a rigid frame that is perimetrically connected to the transition panel 5. It is an aim of the present invention to provide a mirror frame 3 that is pivotably connected to the housing 12 by the boom 2. That is, a first end 21 of the boom 2 is pivotably connected to the housing 12, while a second end 22 of the boom 2 is pivotably connected to the mirror frame 3, opposite the housing 12. The mirror frame 3 further comprises at least one environmental sensor 31 that is integrated into the mirror frame 3. Additionally, the control panel 4 is integrated into the mirror frame 3. In the preferred embodiment of the present invention, the control panel 4 is a collection of buttons which a user actuates to govern the operation of the electronically-controlled transitioning panel. In the present invention the at least one environmental sensor 31 is a photodetector 32 that is positioned adjacent to the first transparent pane. The control panel 4 and the at least one environmental sensor 31 are electronically connected to the microprocessor 11.

In reference to FIG. 3 and FIG. 4, in the present invention, the transition panel 5 is an electronically controlled panel which a user directs to transition between a transparent state and a reflective state. The transition panel 5 comprises an adjustable optical blind 51, a front transparent pane 54, and a back transparent pane 55. The adjustable optical blind 51 is positioned in between the front transparent pane 54 and the back transparent pane 55. In the present invention, the transition panel 5 is electronically connected to the microprocessor 11. It is an aim of the present invention to provide an intelligent transition panel 5 that automatically reduces the amount of light reflected towards a user. This is accomplished through the use of a first adjustable opacity pane 52 that is positioned between the front transparent pane 54 and the adjustable optical blind 51. The first adjustable opacity pane 52 is a pane with an electrochromic device whose opacity is modified by electronic signals generated by the control panel 4 in response to varying intensities of light detected by the photodetector 32. That is, the opacity of the first adjustable opacity pane 52 is modified to in response to light of varying intensity. This feature prevents a user of the electronically-controlled transitioning panel from being blinded by the headlights of a trailing vehicle. The transition panel 5 further comprises a second adjustable opacity pane 53 that is positioned in between the back transparent pane 55 and the adjustable optical blind 51. The second adjustable opacity pane 53 becomes opaque when the adjustable optical blind 51 is in the reflective state. In this way, light is prevented from passing through gaps in the adjustable optical blind 51. Similar to the first adjustable opacity pane 52, the second adjustable opacity pane 53 is an electrochromic device whose opacity is controlled by the microprocessor 11. Additional embodiments of the present invention use LCD panels, suspended particle distribution panels, photochromic panels, and the like as a first adjustable opacity pane 52 and a second adjustable opacity pane 53.

Figure 6:
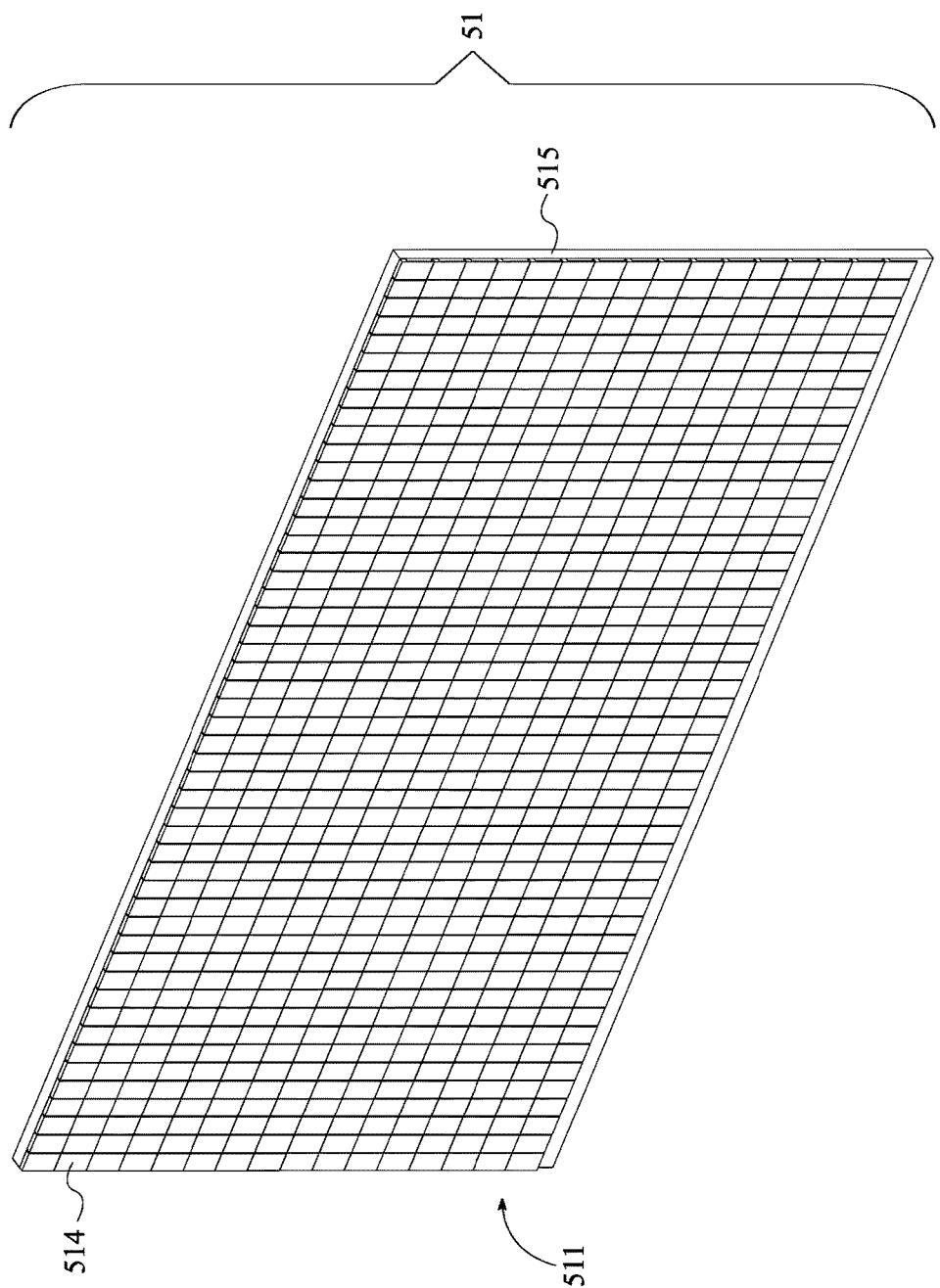
FIG. 6 is a perspective view illustrating the adjustable optical blind used in one embodiment of the present invention. In this embodiment, each of the plurality of micro-blinds is designed with a piezo electric blind body that is a single tab.
Figure 7:
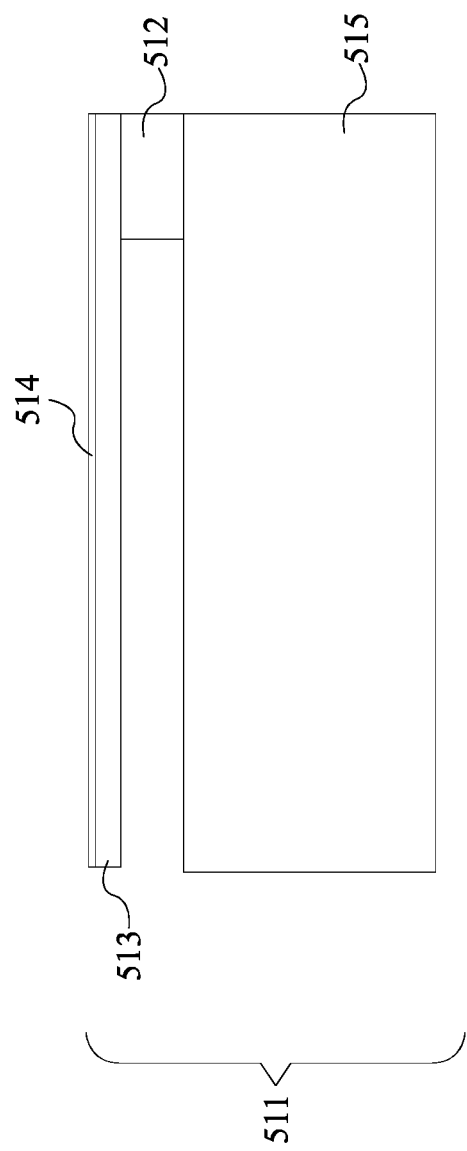
FIG. 7 is a side view of a single micro-blind included in the plurality of micro-blinds used in the present invention.

In reference to FIG. 1, FIG. 6, and FIG. 7, the adjustable optical blind 51 is a panel with mechanical components which transition between a closed and an open configuration. The adjustable optical blind 51 comprises a plurality of micro-blinds 511, and a transparent base pane 515. In the closed configuration, the adjustable optical blind 51 forms a reflective surface, that places the electronically-controlled transitioning panel in a reflective state. Conversely, in the open configuration the adjustable optical blind 51 is a transparent pane, that places the electronically-controlled transitioning panel in a transparent state. Each of the plurality of micro-blinds 511 comprises a fixed terminal 512, a piezoelectric blind body 513, and a reflective coating 514. The plurality of micro-blinds 511 is distributed across the surface of the transparent base pane 515, such that the fixed terminal 512 of each micro-blind is adjacently connected to the transparent base pane 515. The piezoelectric blind body 513 of each micro-blind is connected to the fixed terminal 512, opposite the transparent base pane 515. The reflective coating 514 is superimposed onto the piezoelectric blind body 513, opposite the fixed terminal 512. The piezoelectric blind body 513 is electrically connected to the microprocessor 11, through the fixed terminal 512. In some embodiments the piezoelectric blind body 513 is a continuous strip. In separate embodiments the piezoelectric blind body 513 is a series of tabs. In these embodiments each of the plurality of micro-blinds 511 is positioned parallel to one another on the surface of the transparent base pane 515. In the present invention, micro-blinds are piezoelectric electrodes whose shape is modified by the application of an electrical current supplied by the microprocessor 11. That is, when the plurality of micro-blinds 511 is in the closed configuration the piezoelectric blind body 513 becomes a planar surface that is parallel to the transparent base pane 515. In this configuration the reflective coating 514 is oriented towards the front transparent pane 54. When the plurality of micro-blinds 511 is in the open configuration the piezoelectric blind body 513 is coiled towards the fixed terminal 512. In some embodiments the transition panel 5 uses multiple stacked layers of plurality of micro-blinds 51. In this embodiment the plurality of micro-blinds 51 in each layer are positioned to cover gaps between the electrodes in the complementary layers of pluralities of micro-blinds 51.

Figure 8:
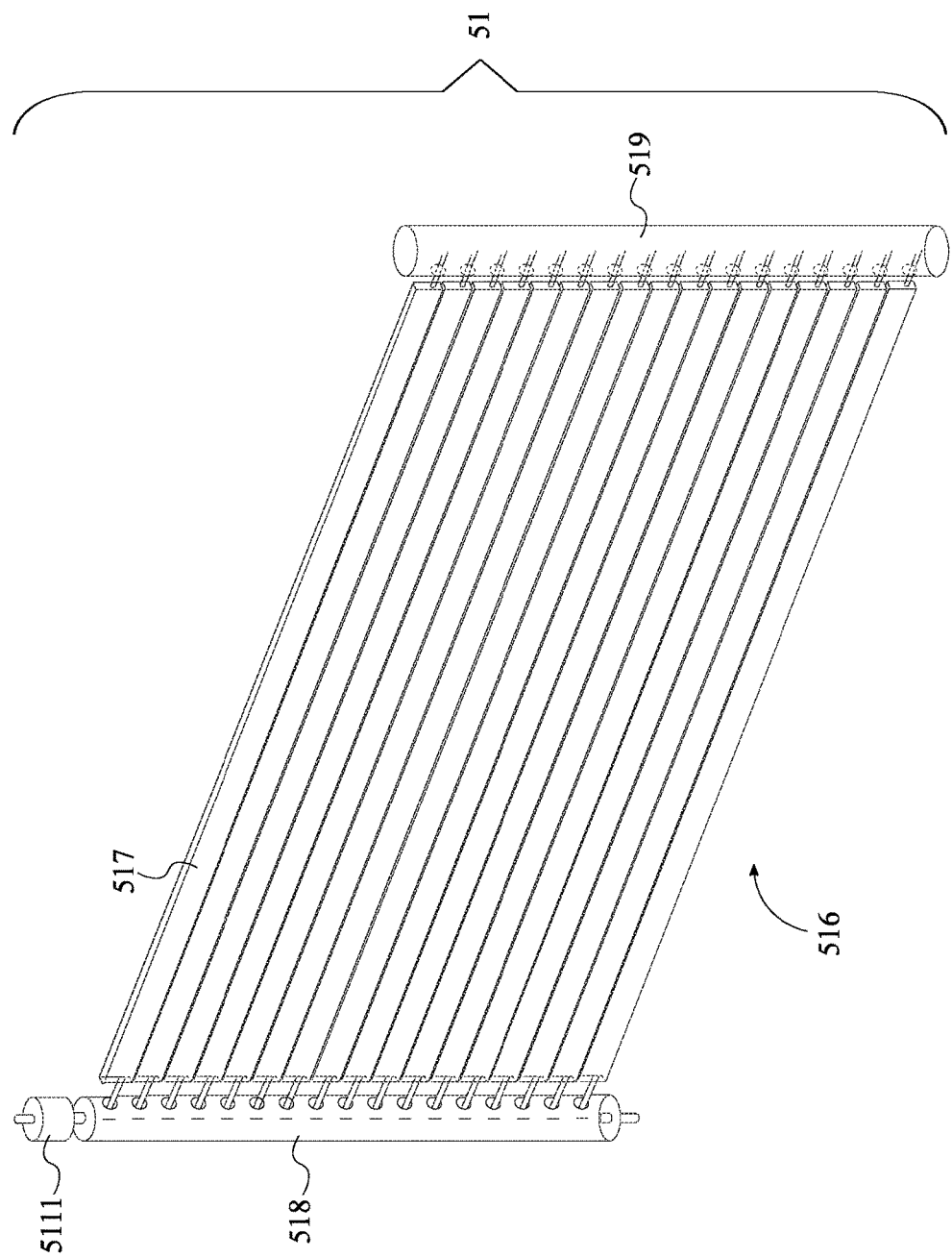
FIG. 8 is a perspective view illustrating the adjustable optical blind used in one embodiment of the present invention. In this embodiment, each of a plurality of slats is actuated by a first actuation mechanism.

In reference to FIG. 8, in a separate embodiment the adjustable optical blind 51 is manufactured with a plurality of slats 516 that open and close similar to a Venetian blind. In this embodiment the adjustable optical blind 51 comprises a plurality of slats 516, a plurality of reflective coatings 517, a first slat support 518, a second slat support 519, and a first actuation mechanism 5111. The adjustable optical blind 51 can transition between a closed configuration and an open configuration. That is, while in the closed configuration the plurality of slats 516 forms a reflective panel, placing the transition panel 5 into a reflective state. While in the open configuration, the adjustable optical blind 51 becomes transparent, placing the transition panel 5 into a transparent state. Each of the plurality of slats 516 is pivotably and adjacently connected to the first slat support 518. Additionally, each of the plurality of slats 516 is pivotably and adjacently connected to the second slat support 519, opposite the first slat support 518. In this embodiment, each of the plurality or slats 516 is oriented parallel to one another. In an alternative embodiment the first actuation mechanism 5111 is a lever mechanism that moves the plurality of slats 516 between the open configuration and the closed configuration.

In reference to FIG. 4 and FIG. 8, the first actuation mechanism 5111 is integrated through the first slat support 518, such that the plurality of slats 516 is operatively coupled to the first actuation mechanism 5111. That is, the first actuation mechanism 5111 causes the plurality of slats 516 to pivot between the open and closed configurations. The first actuation mechanism 5111 is electronically connected to the microprocessor 11. Additionally, the first actuation mechanism 5111 actuates the plurality of slats 516 based upon control signals generated by the microprocessor 11. Each of the plurality of reflective coatings 517 is superimposed onto a corresponding slat from the plurality of slats 516. When the plurality of slats 516 is in the closed configuration the plurality of slats 516 is positioned parallel to the front transparent pane 54, and coplanar to one another. In this configuration the plurality of reflective coatings 517 is oriented towards the front transparent pane 54. When the plurality of slats 516 is in the open configuration each of the plurality of slats 516 is positioned perpendicular to the front transparent pane 54.

Figure 9:
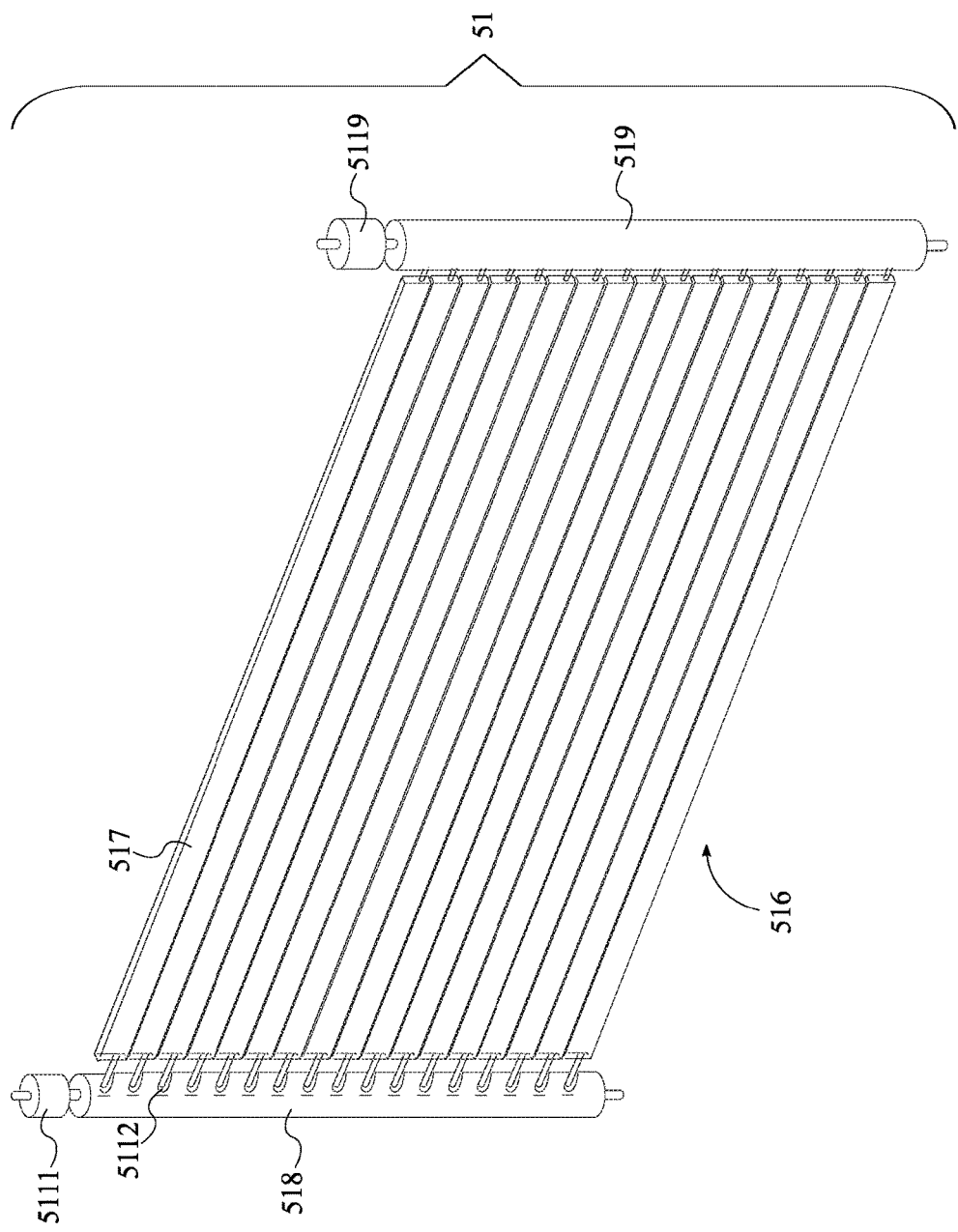
FIG. 9 is a perspective view illustrating the adjustable optical blind used in one embodiment of the present invention. In this embodiment, each of a plurality of slats is actuated along actuation tracks by a first actuation mechanism and a second actuation mechanism.

In reference to FIG. 9, in an additional embodiment of the present invention, the adjustable optical blind 51 is designed with a plurality of slats 516 that move between an open and a closed configuration along a semicircular track 5113. In this embodiment the adjustable optical blind 51 comprises a plurality of slats 516, a plurality of reflective coatings 517, a first slat support 518, a second slat support 519, a first actuation mechanism 5111, and a second actuation mechanism 5119. Each of the plurality of slats 516 is slidably and adjacently connected to the first slat support 518. Additionally, each of the plurality of slat supports is slidably and adjacently connected to the second slat support 519, opposite the first slat support 518. In this embodiment the plurality or slats are oriented parallel to one another. The first actuation mechanism 5111 is integrated through the first slat support 518, such that the plurality of slats 516 is operatively coupled to the first actuation mechanism 5111. The second actuation mechanism 5119 is integrated through the second slat support 519, such that the plurality of slats 516 is operatively coupled to the second actuation mechanism 5119. That is, the first actuation mechanism 5111 and second actuation mechanism 5119 cause the plurality of slats 516 to move between the open and closed configurations. Each of the plurality of reflective coatings 517 is superimposed onto a corresponding slat from the plurality of slats 516.

Figure 10:
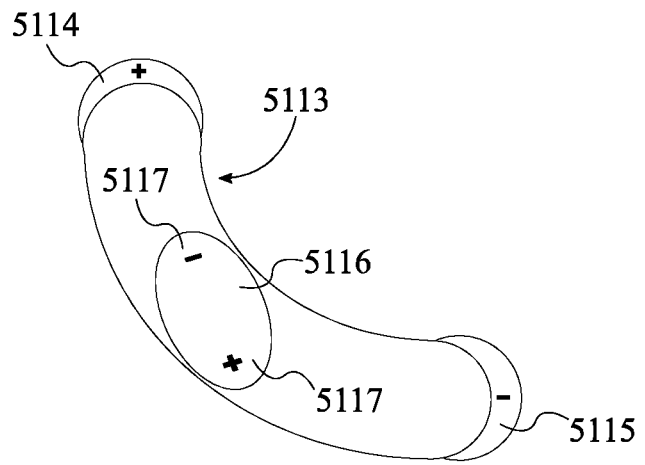
FIG. 10 is an illustrating of a single actuation track used in one embodiment of the present invention.
Figure 11:
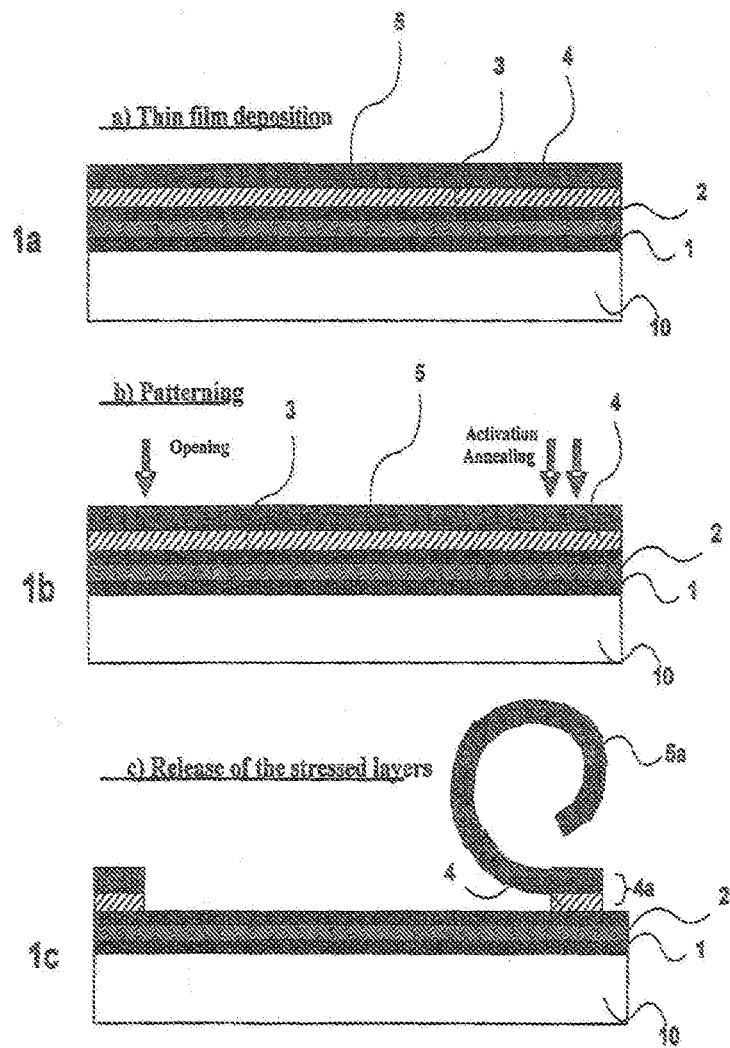
FIG. 11 is a side view illustrating the component layers of a micro-blind array found in U.S. Pat. No. 7,684,105B2. Embodiments of the present invention add supplementary layers which contain materials and technologies that augment the function of existing micro-blind structures.
Figure 12:
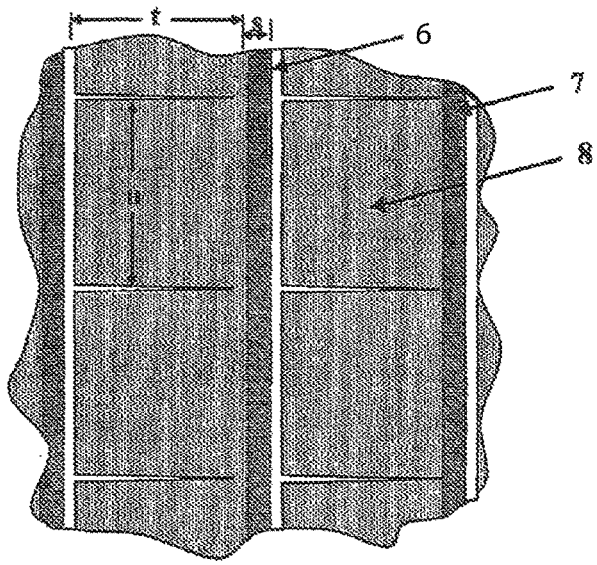
FIG. 12 is a top view illustrating the geometry of a micro-blind array in the open and closed positions. Additionally, this figure depicts the use of supplementary layers of material, technology, and deposition patterns to enhance the operation of the micro-blind array technology disclosed in U.S. Pat. No. 7,684,105B2.
Figure 12:
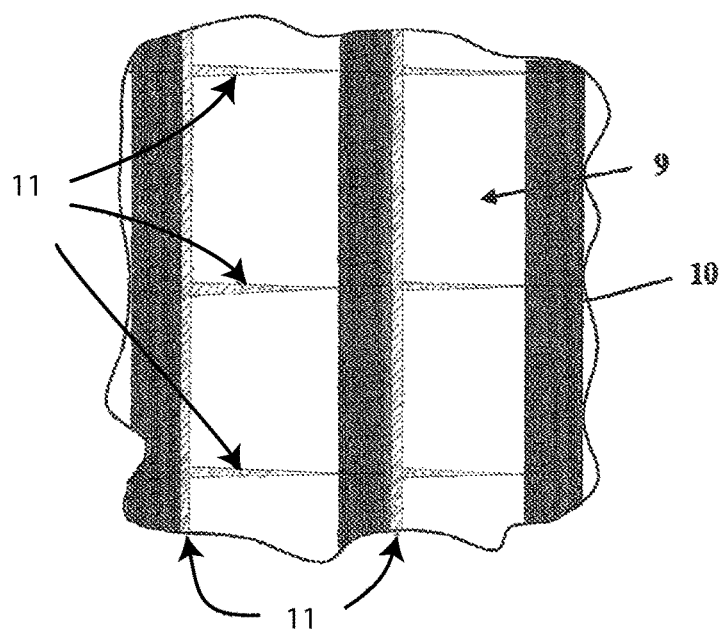

In reference to FIG. 9 and FIG. 10, the first actuation mechanism 5111 and the second actuation each comprise a plurality of actuation tracks 5112. The plurality of slats 516 slide between the open configuration and the closed configuration along the actuation tracks. Each of the plurality of actuation tracks 5112 comprises a semicircular track 5113 and an oblong-shaped pin 5116. The oblong-shaped pin 5116 is engaged along the semicircular track 5113 and comprises a pair of major vertices 5117. The semicircular track 5113 comprises a first track end 5114 and a second track end 5115. The plurality of actuation tracks 5112 use magnetic coupling as well as the first actuation mechanism 5111 and the second actuation mechanism 5119 to move the plurality of slats 516 between the open configuration and the closed configuration. To that end, the first track end 5114 and second track end 5115 are magnetically dipolar to each other. Similarly, the pair of major vertices 5117 are magnetically dipolar to each other. In this way, the magnetic polarities of the first track end 5114 and the second track end 5115 repel and attract the appropriately polarized vertices of the oblong-shaped pin 5116. The oblong-shaped pin 5116 for each of the plurality of actuation tracks 5112 of the first actuation mechanism 5111 is adjacently connected to a corresponding slat. Similarly, the oblong-shaped pin 5116 for each of the plurality of actuation tracks 5112 of the second actuation mechanism 5119 is adjacently connected to a corresponding slat.

Although the invention has been explained in relation to its preferred embodiment, it is to be understood that many other possible modifications and variations can be made without departing from the spirit and scope of the invention as hereinafter claimed.

What is claimed is:

1. An electronically-controlled transitioning panel for a rearview mirror comprises:
    a control unit;
    a boom;
    a mirror frame;
    a control panel;
    a transition panel;
    the control unit comprises a microprocessor, a housing, and a window attachment mechanism;
    the transition panel comprises an adjustable optical blind, a front transparent pane, and a back transparent pane;
    the microprocessor being mounted within the housing;
    the window attachment mechanism being mounted adjacent to the housing;
    a first end of the boom being pivotably and adjacently connected to the housing;
    the mirror frame being pivotably and adjacently connected to a second end of the boom, opposite to the housing;
    the transition panel being perimetrically connected around the mirror frame;
    the control panel being integrated into the mirror frame;
    the adjustable optical blind being positioned in between the front transparent pane and the back transparent pane;
    the control panel being electronically connected to the microprocessor; and
    the microprocessor being electronically connected to the transition panel.

2. The electronically-controlled transitioning panel for the rearview mirror as claimed in claim 1 comprises:
    a display device;
    the display device being integrated into the housing; and
    the display device being electronically connected to the microprocessor.

3. The electronically-controlled transitioning panel for the rearview mirror as claimed in claim 1 comprises:
    at least one environmental sensor;
    the at least one environmental sensor being integrated into the mirror frame; and
    the at least one environmental sensor being electronically connected to the microprocessor.

4. The electronically-controlled transitioning panel for the rearview mirror as claimed in claim 1 comprises:
    the at least one environmental sensor further comprises a photodetector; and
    the photodetector being positioned adjacent to the first transparent pane.

5. The electronically-controlled transitioning panel for the rearview mirror as claimed in claim 1 comprises:
    a first adjustable opacity pane;
    the first adjustable opacity pane being positioned between the front transparent pane and the adjustable optical blind; and
    the first adjustable opacity pane being electronically connected to the microprocessor.

6. The electronically-controlled transitioning panel for the rearview mirror as claimed in claim 1 comprises:
    a second adjustable opacity pane;
    the second adjustable opacity pane being positioned between the back transparent pane and the adjustable optical blind; and
    the second adjustable opacity pane being electronically connected to the microprocessor.

7. The electronically-controlled transitioning panel for the rearview mirror as claimed in claim 1 comprises:
    the adjustable optical blind comprises a plurality of micro-blinds and a transparent base pane;
    each of the plurality of micro-blinds comprises a fixed terminal, a piezoelectric blind body, and a reflective coating;
    the plurality of micro-blinds being distributed across the transparent base pane;
    the fixed terminal being adjacently connected to the transparent base pane;
    the piezoelectric blind body being adjacently connected to the fixed terminal, opposite to the transparent base pane;
    the reflective coating being superimposed onto the piezoelectric blind body, opposite to the fixed terminal; and
    the piezoelectric blind body being electrically connected to the microprocessor, through the fixed terminal.

8. The electronically-controlled transitioning panel for the rearview mirror as claimed in claim 7 comprises:
    the piezoelectric blind body being a continuous strip; and
    the continuous strip for each of the plurality of micro-blinds being positioned parallel to each other.

9. The electronically-controlled transitioning panel for the rearview mirror as claimed in claim 7 comprises:
    the piezoelectric blind body being a series of tabs; and
    the series of tabs for each of the plurality of micro-blinds being positioned parallel to each other.

10. The electronically-controlled transitioning panel for the rearview mirror as claimed in claim 7 comprises:
    wherein the plurality of micro-blinds is in a closed configuration;
    the piezoelectric blind body being positioned parallel to the transparent base pane; and
    the reflective coating being oriented towards the front transparent pane.

11. The electronically-controlled transitioning panel for the rearview mirror as claimed in claim 7 comprises:
    wherein the plurality of micro-blinds is in an open configuration; and
    the piezoelectric blind body being coiled towards the fixed terminal.

12. The electronically-controlled transitioning panel for the rearview mirror as claimed in claim 1 comprises:
    the adjustable optical blind comprises a plurality of slats, a plurality of reflective coatings, a first slat support, a second slat support, and an actuation mechanism;
    each of the plurality of slats being pivotably and adjacently connected to the first slat support;
    each of the plurality of slats being pivotably and adjacently connected to the second slat support, opposite to the first slat support;
    the plurality of slats being oriented parallel to each other;
    the first actuation mechanism being integrated through the first slat support;
    each of the plurality of slats being operatively coupled to the first actuation mechanism, wherein the actuation mechanism actuates the plurality of slats between an open configuration and a closed configuration;

the first actuation mechanism being electronically connected to the microprocessor; and each of the plurality of reflective coatings being superimposed onto a corresponding slat from the plurality of slats.

13. The electronically-controlled transitioning panel for the rearview mirror as claimed in claim 12 comprises:

wherein the plurality of slats is in a closed configuration;

the plurality of slats being positioned parallel to the front transparent pane;

the plurality of slats being positioned coplanar to each other; and each of the plurality of reflective coatings being oriented towards the front transparent pane.

14. The electronically-controlled transitioning panel for the rearview mirror as claimed in claim 12 comprises:

wherein the plurality of slats is in an open configuration; and each of the plurality of slats being positioned perpendicular to the front transparent pane.

15. The electronically-controlled transitioning panel for the rearview mirror as claimed in claim 1 comprises:

the adjustable optical blind comprises a plurality of slats, a plurality of reflective coatings, a first slat support, a second slat support, a first actuation mechanism, and a second actuation mechanism;

each of the plurality of slats being slidably and adjacently connected to the first slat support;

each of the plurality of slats being slidably and adjacently connected to the second slat support, opposite to the first slat support;

the plurality of slats being oriented parallel to each other;

the first actuation mechanism being integrated through the first slat support;

the second actuation mechanism being integrated through the second slat support;

each of the plurality of slats being operatively coupled to the first actuation mechanism and the second actuation mechanism, wherein the first actuation mechanism and the second actuation mechanism actuates the plurality of slats between an open configuration and a closed configuration;

the first actuation mechanism and the second actuation mechanism being electronically connected to the microprocessor; and each of the plurality of reflective coatings being superimposed onto a corresponding slat from the plurality of slats.

16. The electronically-controlled transitioning panel for the rearview mirror as claimed in claim 15 comprises:

the first actuation mechanism and the second actuation mechanism each comprise a plurality of actuation tracks;

each of the plurality of actuation tracks comprises a semicircular track and an oblong-shaped pin;

the oblong-shaped pin comprises a pair of major vertices;

the semicircular track comprises a first track end and a second track end;

the first track end and the second track end being magnetically dipolar to each other;

the pair of major vertices being magnetically dipolar to each other;

the oblong-shaped pin being engaged along the semicircular track;

the oblong-shaped pin for each of the plurality of actuation tracks of the first actuation mechanism being adjacently connected to the corresponding slat; and the oblong-shaped pin for each of the plurality of actuation tracks of the second actuation mechanism being adjacently connected to the corresponding slat.

17. The electronically-controlled transitioning panel for the rearview mirror as claimed in claim 15 comprises:

wherein the plurality of slats is in a closed configuration;

the plurality of slats being positioned parallel to the front transparent pane;

the plurality of slats being positioned coplanar to each other; and each of the plurality of reflective coatings being oriented towards the front transparent pane.

18. The electronically-controlled transitioning panel for the rearview mirror as claimed in claim 15 comprises:

wherein the plurality of slats is in an open configuration; and each of the plurality of slats being positioned perpendicular to the front transparent pane.

19. The electronically-controlled transitioning panel for the rearview mirror as claimed in claim 6 comprises:

the second adjustable opacity pane being at least one supplementary adjustable optical blind;

the at least one supplementary adjustable optical blind being positioned between the back transparent pane and the adjustable optical blind; and the at least one supplementary adjustable optical blind being electronically connected to the microprocessor.

* * * * *